UNITED STATES PATENT OFFICE.

JOHANN A. W. WOLTERS, OF LEIPSIC, SAXONY, GERMANY.

MANUFACTURE OF ANHYDROUS SULPHURIC ACID.

SPECIFICATION forming part of Letters Patent No. 223,571, dated January 13, 1880.

Application filed August 24, 1878.

*To all whom it may concern:*

Be it known that I, Dr. JOHANN AUGUST WILHELM WOLTERS, of Leipsic, in Saxony, in the Empire of Germany, have invented an Improved Process for the Manufacture of Anhydrous Sulphuric Acid; and I do hereby declare that the following is a full, clear, and exact description of the same.

The process of manufacturing sulphuric anhydride is based on the reaction of sulphate of magnesia on bisulphate of soda, at which reaction the sulphuric anhydride is liberated by the aid of heat.

Instead of the above-named compound of soda the compounds of potash may be used, and instead of the compounds of magnesia the compounds of the other so-called vitriols and alkaline earths may be used.

In carrying out my invention, I produce in the well-known manner anhydrous bisulphate of soda by heating sulphate of soda (Glauber's salt) with sulphuric acid, and produce in the well-known manner anhydrous sulphate of magnesia by heating crystallized sulphate of magnesia, (bitter salt.) These two products—viz., the anhydrous bisulphate of soda and the anhydrous sulphate of magnesia—I mix in a powdered state, and subject the mixture to distillation at a temperature of 300° to 500° Celsius. The distilled product will be sulphuric anhydride, which must be preserved in carefully-stopped vessels.

The residue of the distilling process will be the double salt, $\begin{matrix} SO_4 - Na \\ SO_4 > Mg \\ SO_4 - Na \end{matrix}$. This double salt may be separated by water and crystallization in order to be used over again in the process of manufacturing sulphuric anhydride.

I am aware that sulphuric anhydride has been obtained from anhydrous bisulphate of soda, and that it also has been obtained from anhydrous sulphate of magnesia, and this I do not claim; but,

Having thus described my invention, what I claim is—

1. The obtaining of anhydrous sulphuric acid by subjecting a mixture of anhydrous bisulphate of soda to the action of anhydrous sulphate of magnesia, substantially as described.

2. The preparation and purification of the resulting double salt, being a bisulphate of sodium and a sulphate of magnesium, by evaporation and crystallization, as set forth, for the renewed use in the process of manufacture of sulphuric anhydride.

This specification signed by me this 27th day of May, 1878.

DR. W. WOLTERS.

Witnesses:
 GUST. SEIDEL,
 A. RUPPERT.